E. C. BAECK.
MARINE VESSEL.
APPLICATION FILED SEPT. 29, 1917.
1,267,956.
Patented May 28, 1918.
2 SHEETS—SHEET 1.
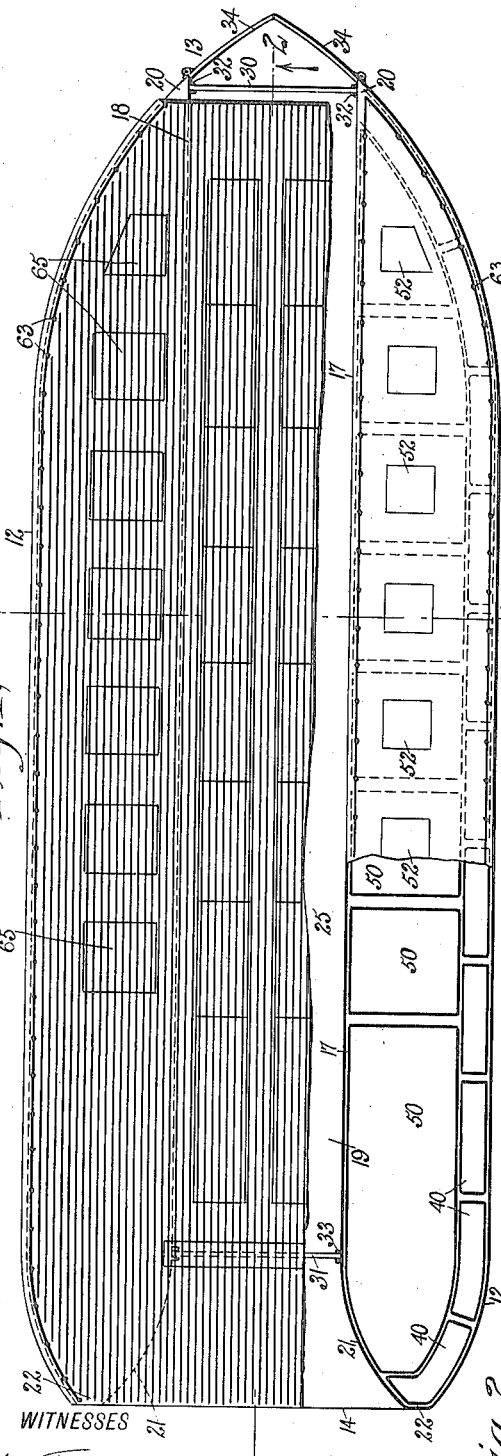
WITNESSES
Edw. Thorpe
INVENTOR
E. C. Baeck
BY
ATTORNEYS

E. C. BAECK.
MARINE VESSEL.
APPLICATION FILED SEPT. 29, 1917.

1,267,956.

Patented May 28, 1918.
2 SHEETS—SHEET 2.

WITNESSES
Edw. Thorpe
Rev. G. Hostr

INVENTOR
E. C. Baeck
BY
ATTORNEYS

UNITED STATES PATENT OFFICE.

EUGÈNE C. BAECK, OF IRVINGTON, NEW YORK.

MARINE VESSEL.

1,267,956.

Specification of Letters Patent.

Patented May 28, 1918.

Application filed September 29, 1917. Serial No. 193,972.

*To all whom it may concern:*

Be it known that I, EUGÈNE C. BAECK, a citizen of the United States, and a resident of Irvington-on-the-Hudson, in the county of Westchester and State of New York, have invented a new and Improved Marine Vessel, of which the following is a full, clear, and exact description.

The object of the invention is to provide a new and improved marine vessel more especially designed for the transportation of a large amount of supplies or freight for supplying vessels at sea or to be carried to distant ports. Another object is to provide a base for aeroplanes, submarines and other small air or marine craft. Another object is to permit the use of the marine vessel as a floating dry dock.

In order to accomplish the desired result, use is made of a hull having a lengthwise passage open at the bow and stern for the entrance and exit of floats carrying cars, submarines and other small marine vessels, and gates adapted to close the ends of the said passage. Use is also made of separate and distinct cargo carrying compartments arranged within the hull on opposite sides of the passage, to permit of loading such compartments from the cars held on a float in the passage, and unloading such cargoes into the vessels to be supplied and likewise held in the passage. Use is further made of a platform supported a distance above the top deck of the hull and practically following the contour of the hull to provide a base for aeroplanes to start from and alight on.

A practical embodiment of the invention is represented in the accompanying drawings forming a part of this specification, in which similar characters of reference indicate corresponding parts in all the views.

Figure 1 is a plan view of the marine vessel with part of the aeroplane platform and the upper deck broken out;

Fig. 2 is a longitudinal sectional elevation of the same on the line 2—2 of Fig. 1;

Fig. 3 is a side elevation of the same;

Figure 4:
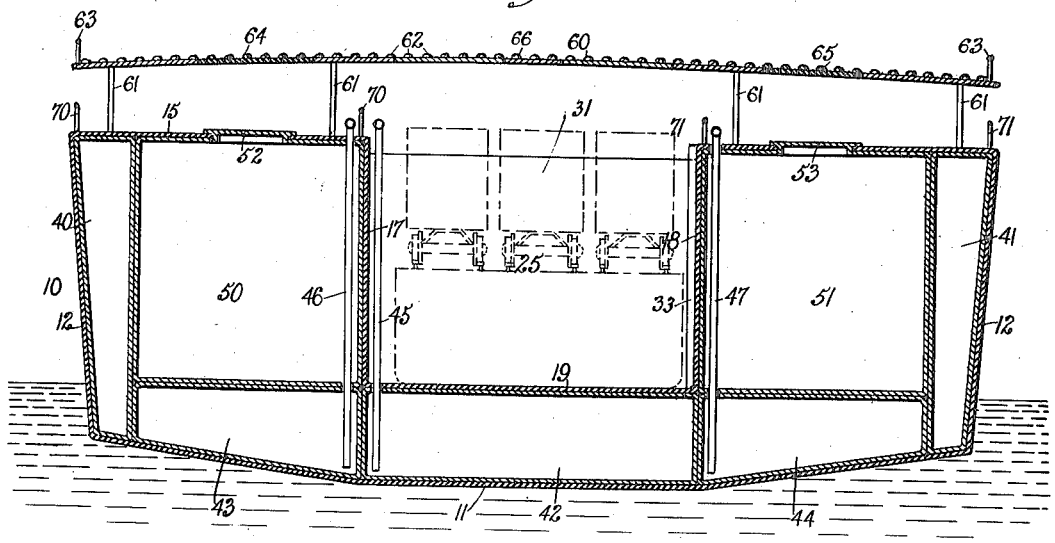
Fig. 4 is an enlarged cross section of the marine vessel on the line 4—4 of Fig. 1.

The hull 10 of the marine vessel is provided with a bottom 11, outwardly inclined sides 12, a pointed bow 13 and a square stern 14. From the sides 12 extend inwardly two decks 15 and 16 having their inner edges spaced apart and connected with the upper ends of lengthwise extending partitions or walls 17, 18, connecting at their lower ends with a false bottom 19 extending a distance above the hull portion of the bottom 11. The forward ends of the partitions 17 and 18 are joined at 20 with the sides 12 at the bow 13, and the rear ends 21 are curved outwardly and rearwardly and joined to inward extensions 22 of the rear ends of the sides 12. By the arrangement described the longitudinal passage 25 is formed in the middle of the hull and which passage is open at the ends and adapted to be closed by gates 30 and 31, preferably mounted to slide up and down in suitable guideways 32, 33 arranged on the partitions 17 and 18. The marine vessel is provided with a prow 34, preferably made in hinged sections, arranged in front of the gate 30 and adapted to be swung open whenever it is desired to flood the passage 25 at the time the gates 30 and 31 are in open position.

Figure 5:
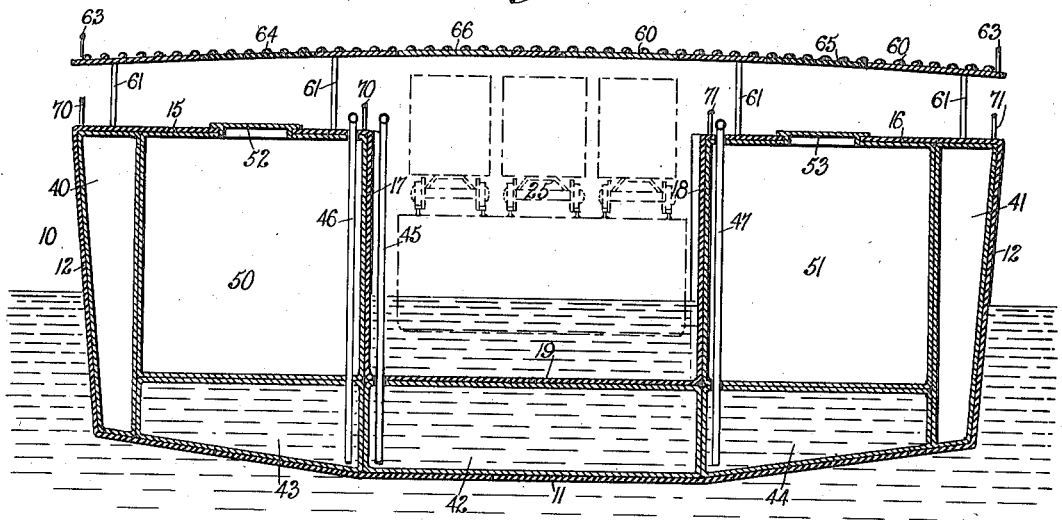
Fig. 5 is a similar view of the same with the water tanks filled to flood the passage.

Within the hull 10 and arranged adjacent the sides 12 are located air tanks 40 and 41 reaching from the bottom 11 to the decks 15, 16 to give the desired buoyancy to the marine vessel. Air and water tanks 42 are arranged intermediate the middle portion of the bottom 11 and the false bottom 19, and similar tanks 43, 44 rest on the bottom 11 intermediate the sides of the tanks 42 and the lower portions of the air tanks 40 and 41. Pipes 45, 46 and 47 connect with the tanks 42, 43 and 44 to permit of filling the same with water by the use of suitable pumps connected with the said pipes to lower the marine vessel in the water with a view to flood the passage 25, as plainly indicated in Fig. 5. In a like manner the tanks 42, 43 and 44 can be emptied of water to cause the marine vessel to rise with the water level below the false bottom 19 of the passage 25 thus converting the marine vessel into a dry dock. The tanks 42, 43 and 44 are preferably spaced apart (see Fig. 2) to provide storage room for gasolene and other oils which may be used as fuel.

The freight compartments 50, 51 are arranged on the top of the tanks 43, 44 but break joint with the same and extend between the partitions 17 and 18 and the inner walls of the air compartments 40, 41. The tops of the freight compartments 50, 51 reach to the decks 15 and 16. The compartments 50 and 51 are provided with hatches 52, 53 extending through the decks 15 and 16 to permit of loading the compartments with supplies and other freight or removing the same therefrom. The rearmost compartments 50, 51 may be used for propelling machinery and the like in case it is desired to propel the marine vessel by power, but as this feature is common to power driven vessels no details are shown.

In order to provide a base for aeroplanes and like air craft use is made of a platform 60 supported above the decks 15 and 16 by suitable posts 61 erected on the decks 15 and 16. The platform 60 has its margin following that of the hull 10 thus providing a large surface for aeroplanes to start from and to return to. The platform 60 is preferably provided on top with longitudinally extending ribs 62 to prevent the wheels of the aeroplanes from skidding or slipping sidewise, thereby adding to the safety of the aeroplanes on starting off or returning to the platform or while the marine vessel is in motion and is rolling sidewise. The platform 60 is located a distance above the decks 15 and 16 to provide space for persons to comfortably walk on the decks 15 and 16 or to permit the erection of cabins intermediate the decks and platform 60 for the accommodation of the crew or passengers. Suitable railings 63 are arranged at the sides of the platform 60 and the latter is also provided with hatches 64, 65 directly above the hatches 52, 53 to allow of passing freight to the hatches 52 and 53 when loading the compartments 50, 51 or when removing freight from the same. Similar hatches 66 are arranged at the middle of the platform to permit of taking freight from freight cars and loading the same into the compartments 50, 51 by the use of suitable derricks or for removing such freight from the compartments to vessels held within the passage 25 at the time. The decks 15 and 16 are also provided with suitable railings 70, 71.

It will be noticed that when the tanks 42, 43, 44 are filled with water and the prow 34 and the gates 30, 31 are open then a sufficient amount of water is in the passage 25 to permit floats carrying freight cars to pass into the passage and to allow of unloading the cars into the compartments 50, 51, and when this has been accomplished the float with the empty freight cars thereon may be floated out of the passage 25. After the compartments 50 and 51 have been loaded then another float with cargo carrying freight cars may be run into the passage 25, or small boats such as houseboats, submarines and the like may be floated in the passage 25. The tanks 42, 43, 44 are now emptied of water to allow the marine vessel to rise and empty the passage 25 of water.

The passage 25 is now closed at the ends by closing the gates 30, 31 and likewise the prow 34. After the gates 30 and 31 and the prow 34 have been closed the water in the passage 25 may be pumped out to allow the float or vessels thereon to settle and rest on the false bottom 19. Thus loaded and sealed railroad cars can be transported to distant ports and run off onto railroad tracks to be transported on land to their final destination. The marine vessel can be towed or propelled by its own power to a distant point either to unload at sea or at a distant port. When unloading at sea the gates 30, 31 and the prow 34 are opened and the tanks 42, 43, 44 are refilled to lower the vessel and allow other vessels such as submarines and the like to pass into the passage 25 to be loaded from the compartments 50, 51. If the vessel is towed to a distant port the compartments 50, 51 may be unloaded without first refilling the tanks 42, 43, 44. It will further be noticed that submarines and other vessels may find a harbor at sea for shelter or repairs or for other purposes. It will further be noticed that by the construction described the marine vessel is not liable to sink in case it is shelled by an enemy as the individual compartments 40, 41, 42, 43, 44, 50, 51, even if some of them be struck by shells and flooded with water, are not liable to cause the vessel to sink.

From the foregoing it will be seen that the marine vessel is practically unsinkable, forms a base for aeroplanes, submarines and other small craft, and is capable of supplying vessels at sea in an exceedingly safe manner.

Having thus described my invention, I claim as new and desire to secure by Letters Patent:—

1. A marine vessel, comprising a hull having a longitudinal central passage extending from bow to stern and open at both ends, freight compartments at each side of said passage, air compartments at the sides of the freight compartments, water tanks below the said passage and freight compartments, gates for closing the central passage, a hinged prow in front of the front gate, and means for filling and emptying the said tanks to increase or decrease the draft of the vessel.

2. A marine vessel, comprising a hull having a lengthwise passage extending from the bow of the hull to the stern thereof and open at both ends, the bottom of the passage being spaced from the bottom of the hull, air compartments within the hull adjacent the sides thereof, freight compartments within the hull between the said air compartments and the sides of the passage, closed water tanks resting on the bottom of the hull and located underneath the bottoms of the said passage and the said freight compartments, gates for closing the said passage, and means for filling and emptying the said tanks.

3. A marine vessel, comprising a hull having a lengthwise passage extending from the bow of the hull to the stern thereof and open at both ends, the bottom of the passage being spaced from the bottom of the hull, the hull having side decks extending to the upper ends of the sides of the passage, freight compartments fitted in the hull below the decks thereof adjacent the sides of the passage, and hatches at the decks extending through the tops of the freight compartments, gates for closing the passage, water tanks below the passage and compartments and means for filling and emptying said tanks.

4. A marine vessel having a central longitudinal passage extending from bow to stern and open at both ends, freight compartments on each side of the passage, gates for closing the passage, and means for increasing the draft of the vessel to permit water to enter the passage-way when the gates are opened, whereby provision is made for floating cars into the central passage to permit their contents to be readily placed in the said compartments.

EUGÈNE C. BAECK.